United States Patent

Hine et al.

[11] Patent Number: 5,935,389
[45] Date of Patent: Aug. 10, 1999

[54] LIQUID DISTRIBUTOR TRAY

[75] Inventors: Christopher John Hine, Guilford, United Kingdom; Ramachandran Krishnamurthy, Chestnut Ridge, N.Y.; James Linden Trotter, Cropston; Denis Henry Lyon, Redbridge, both of United Kingdom

[73] Assignee: The BOC Group, Inc., New Providence, N.J.

[21] Appl. No.: 08/858,643

[22] Filed: May 19, 1997

[51] Int. Cl.$^6$ ........................................ B01D 3/32
[52] U.S. Cl. ........................ 202/158; 202/267.1; 261/96; 261/97; 261/113
[58] Field of Search .................. 202/158, 267.1, 202/DIG. 6; 261/96–97, 113, 114.1, 114.5

[56] References Cited

U.S. PATENT DOCUMENTS

| | | | |
|---|---|---|---|
| 4,427,605 | 1/1984 | Meier et al. | 202/158 |
| 4,472,325 | 9/1984 | Robbins | 261/96 |
| 4,776,989 | 10/1988 | Harper et al. | 261/97 |
| 4,820,455 | 4/1989 | Kunesh et al. | 261/113 |
| 4,836,989 | 6/1989 | Aly et al. | 422/195 |
| 4,839,108 | 6/1989 | Silvey | 202/158 |
| 4,847,430 | 7/1989 | Quang et al. | 568/697 |
| 5,240,652 | 8/1993 | Taylor et al. | 261/97 |
| 5,776,316 | 7/1998 | Potthoff et al. | 202/158 |

*Primary Examiner*—Virginia Manoharan
*Attorney, Agent, or Firm*—David M. Rosenblum; Salvatore P. Pace

[57] ABSTRACT

A liquid distributor tray for a distillation column for distributing a descending liquid phase to be contacted with an ascending vapor phase within the distillation column. A tray is provided for collecting the descending liquid phase and has rows of apertures for downward passage of the descending liquid phase. Rows of vapor risers are located between the rows of apertures for a passage of the ascending vapor phase, and an upward direction through the tray. Rows of elongated liquid collectors are located above the rows of vapor risers and between the rows of apertures for collecting all or part of the descending liquid phase before the descending liquid phase reaches the tray. Rows of elongated liquid collectors provided with slots or openings are provided for collecting and then redistributing the descending liquid phase caught in the liquid collectors over a central region of the tray. Such redistribution prevents replication of maldistribution throughout the column. Vapor risers can be connected to a distributor trough and be given a rectangular cross-section to provide a sufficient structural rigidity to the tray that such tray can be fabricated with the use of sheet metal and riveted construction.

9 Claims, 2 Drawing Sheets

LIQUID DISTRIBUTOR TRAY

BACKGROUND OF THE INVENTION

The present invention relates to a liquid distributor tray for a distillation column in which a descending liquid phase of a mixture to be separated is collected and redistributed between beds of packing elements. More particularly, the present invention relates to such a liquid distributor tray in which rows of elongated liquid collectors are located above rows of vapor risers and between rows of apertures located within the distributor tray for collecting part of the liquid descending within the column and then directing/channeling such liquid to a central region of the tray.

It is well known to separate mixtures within distillation columns by a process known as fractional distillation. In accordance with such method, ascending vapor and descending liquid phases of a mixture to be separated are formed within a column. The ascending vapor phase becomes richer in the light components of the mixture as it ascends and the descending liquid phase becomes richer in the heavier components of the mixture as it descends due to mass transfer between the phases. In order to carry out the process the vapor and liquid phases are contacted by mass transfer media such as random or structured packings. Packings are contained within the column in discrete regions known as beds. Liquid is distributed onto the top/upper surface of the beds and the packing causes the liquid to spread out such that a descending film of the liquid is formed. The vapor phase rises through the packing elements and contacts the liquid phase to effect the required mass transfer.

The efficiency of such packing depends upon the degree to which liquid mixes with vapor as well as adjacent liquid within the packing bed. However, in forming the film, the liquid tends to spread out randomly across the cross-section of the column. In order to foster uniform liquid mixing, liquid is redistributed between beds of packing. This redistribution is effected by known liquid distributor trays that are designed to collect the liquid and then to distribute the collected liquid through a regular arrangement of apertures such as holes in the tray or metering tubes spaced at regular intervals. In order to allow vapor to pass upwardly through the tray without substantial pressure drop, vapor risers, also known in the art as chimneys, are connected to the tray in a regular arrangement between the apertures.

In order to promote liquid mixing in the distributor tray, various devices are employed to collect and centrally distribute descending liquid onto the distributor tray. For instance, chevron-like collector vanes are positioned to catch all descending liquid before such liquid reaches the distributor tray. The chevron-like collector vanes are provided with openings at opposite ends thereof to distribute liquid to a ring channel located above the distributor tray. The ring channel is an annular device having a central open area. Liquid overflows the ring channel and falls through the central open area onto the distributor tray. Alternatively, a collector tray arrangement is employed in which collector trays are positioned above the distributor tray. The collector tray has a central open area from which liquid flows to the distributor tray. Central distributor troughs connected and thus supported by vapor risers are employed to redistribute liquid onto the distributor tray for greater mixing of the descending liquid.

As can be appreciated, the use of a ring channel or a collector tray, in addition to the liquid distributor tray, adds to the expense and complexity of the column Additionally, in order to prevent maldistribution of the liquid due to imperfections in the surface of the tray, liquid distributor trays can be fabricated by welded, stainless steel construction. Welding in and of itself can produce local deformation and distortion. This is prevented by employing relatively thick stock in the fabrication of liquid distributor trays. As a result, liquid distributor trays are often heavy, expensive fixtures.

As will be discussed, the present invention provides a liquid distributor tray that is designed to promote liquid mixing between beds of packing without the use of separate appliances. Additionally, the present invention incorporates such object in a liquid distributor tray design that can be inexpensively and more lightly constructed than prior art liquid distributor trays.

SUMMARY OF THE INVENTION

The present invention provides a liquid distributor tray for a distillation column to distribute a descending liquid phase to be contacted with an ascending vapor phase within the distillation column. A tray is provided for collecting the descending liquid phase. The tray has rows of apertures for downward passage of the descending liquid phase. In this regard, the term "apertures" as used herein and in the claims means openings or liquid metering tubes or like structures. A plurality of rows of vapor risers are located between the rows of apertures for passage of the ascending vapor phase, in an upward direction, through the tray. A plurality of rows of elongated liquid collectors are located above the rows of vapor risers and between the rows of apertures for collecting at least part of the descending liquid phase before the descending liquid phase reaches the tray. The rows of elongated liquid collectors have central redistribution means for redistributing the at least part of the descending liquid phase over a central region of the tray.

Thus, part of the liquid descending is captured, mixed, and then redistributed over a center region. This is done in the present invention by appropriate design of the liquid collectors as opposed to the use of separate fixtures such as ring channels or collector trays.

In other aspects, the central redistribution means can feed liquid into a distributor trough located between the central redistribution means and over the central region. The vapor risers can be connected to the distributor trough for adding to the structural rigidity of the distributor tray. In fact, the distributor trough and vapor risers can produce the structure that allows for sheet metal, riveted construction.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
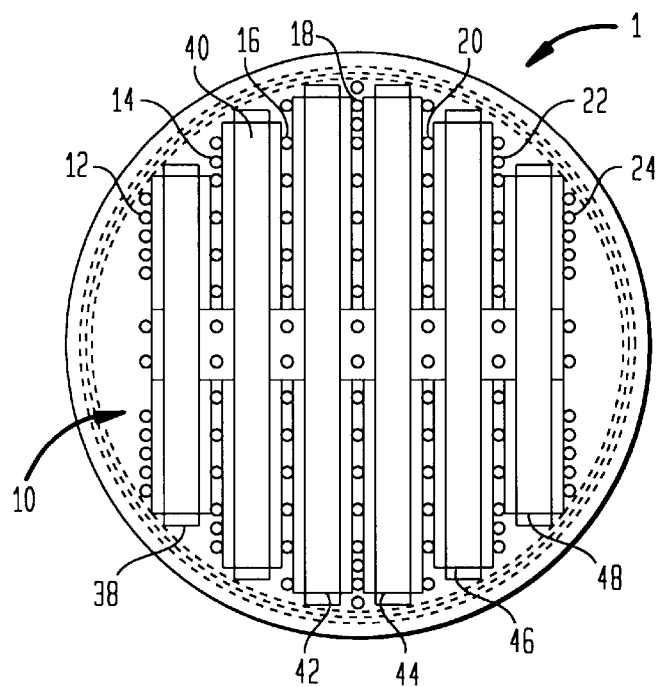
FIG. 1 is a top plan view of a liquid distributor tray in accordance with the present invention.
Figure 2:
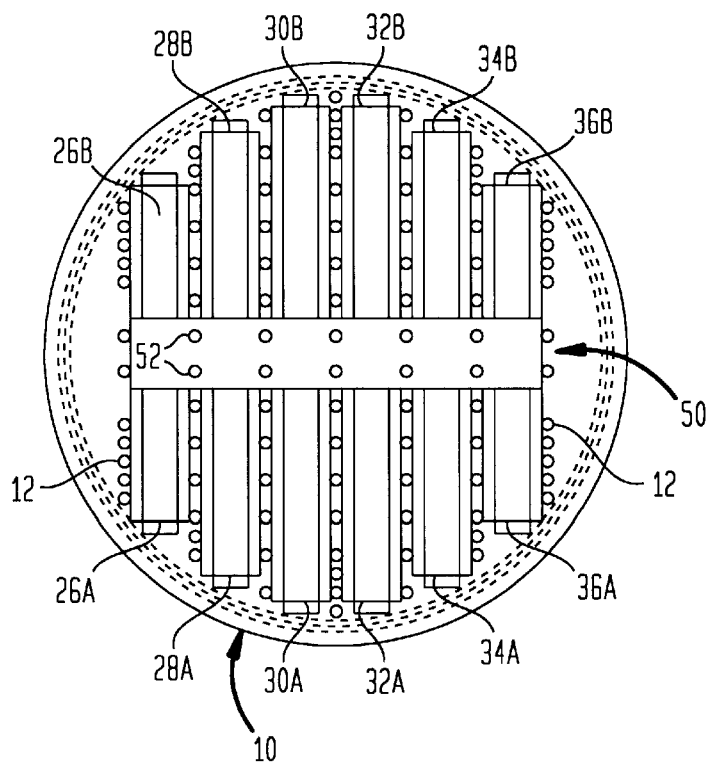
FIG. 2 is a fragmentary view of FIG. 1 with rows of elongated liquid collectors removed to show the vapor risers and distributor troughs.

With reference to the FIG. 1, a liquid distributor tray 1 as illustrated that includes a tray 10 having rows of apertures 12, 14, 16, 18, 20, 22 and 24. The apertures allow for downward passage of the descending liquid phase. With additional reference to FIG. 2, a plurality of rows of paired vapor risers 26A,26B, 28A,28B, 30A,30B, 32A,32B, 34A, 34B, and 36A,36B are provided to allow the ascending vapor phase to pass upwardly, through tray 10. Spaced apart rows of elongated liquid collectors 38, 40, 42, 44, 46 and 48 are provided above vapor risers 26A through 36A and 26B through 36B and also between rows of apertures 12. The rows of elongated liquid collectors 38 through 48 collect part of the descending liquid phase, that does not flow between liquid collectors 38 though 48, and directs or channels it to a central region of liquid tray 10 by redistributing that part of the liquid collected to a distributor trough 50 having rows of openings 52.

As illustrated, tray 10 is circular to fit within the circular cross-section of a distillation column, not illustrated. Tray 10 would be supported in a manner well known in the art that would allow for thermal expansion and contraction of tray 10. Tray 10, as stated previously, is provided with rows of apertures 12 through 24 which are in the form of holes within tray 10. Liquid collects on tray 10, pools and redistributes to the next lowest bed through apertures 12.

Figure 3:
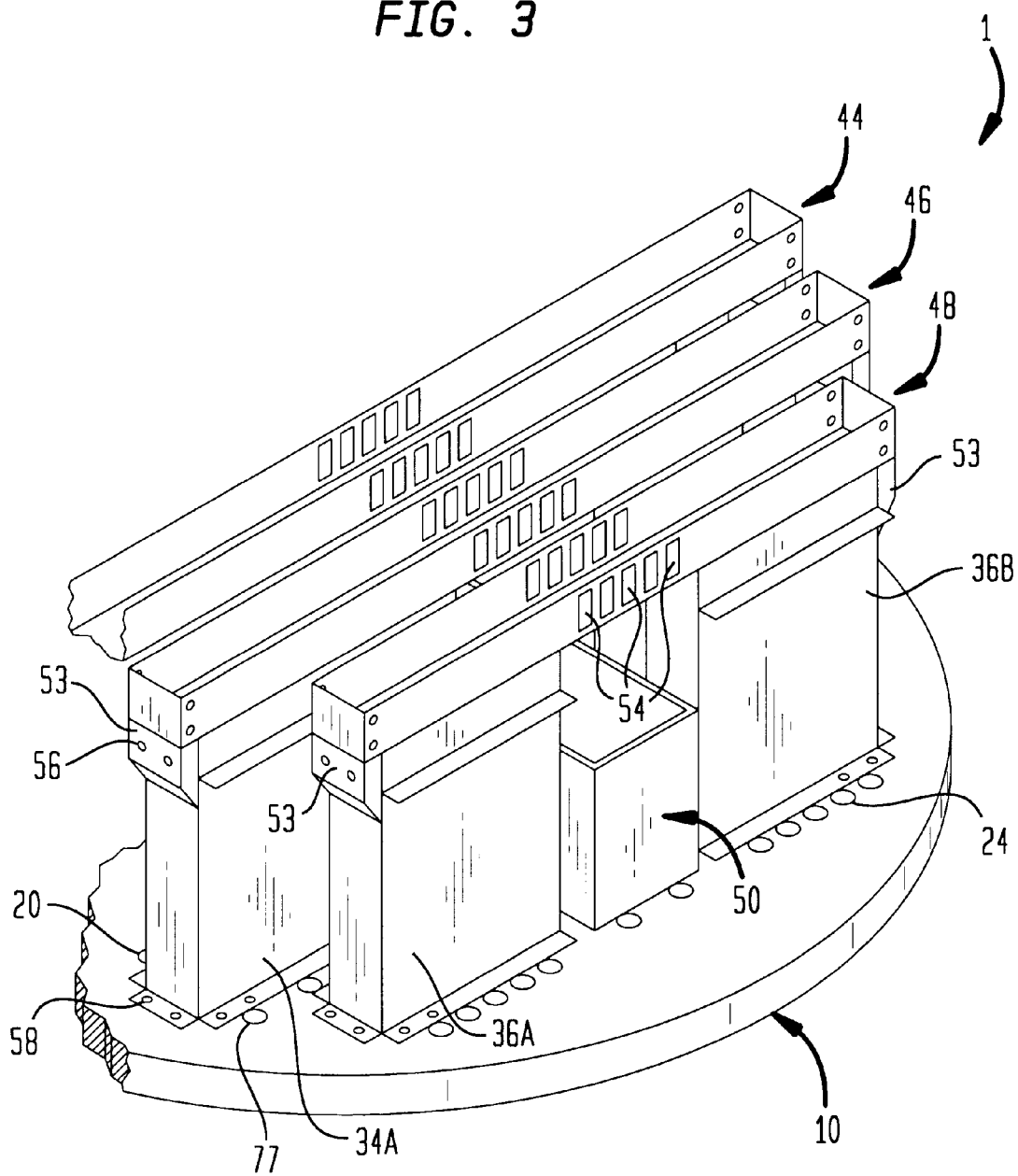
FIG. 3 is a fragmentary perspective view of FIG. 1.

With reference to FIG. 3, liquid collectors 38 through 48 are each of open, box-like construction and are provided with central rows of slots 54 to redistribute liquid into a distributor trough 50. Distributor trough 50 is provided with bottom openings 52 to centrally distribute the liquid onto tray 10. It is understood, however, that in small columns, distributor trough 50 might be deleted and in such case, liquid would simply fall onto a central region of tray 10, that is the region located beneath slots 54. Because of this, in such smaller applications, liquid collectors 38 through 48 might be replaced with openings at their bottom wall from which liquid would fall onto tray 10. Liquid collectors 38 through 48 also serve another function by covering vapor riser pairs 26A, 26B through 36A, 36B. As can be appreciated by those skilled in the art, vapor riser tray pairs 26A, 26B through 36A, 36B could be separately hatted for such purpose and elongated liquid collectors 38 through 48 would simply lay across channel sections which were placed on the hats of vapor riser pairs 26A, 26B through 36A, 36B.

As illustrated, vapor riser pairs 26A,26B through 36A, 36B are connected to distributor trough 50 to form a rigid structure that imparts rigidity or stiffness into tray 10. In this regard, each of vapor risers 26A,26B through 36A,36B are preferably of rectangular cross-sections. Such rectangular construction acts like a box beam to further induce rigidity or stiffness into tray 10. At the same time, since such pairs of vapor risers 26A,26B through 36A,36B are also connected to distributor trough 50, a combined structure is formed that imparts an especially rigid structure. In such structure, distributor trough 50 provides a box beam at right angles or in an orthogonal direction to the rectangular cross-sections of paired vapor risers 26A,26B through 36A, 36B. The stiffness imparted by such construction allows for aluminum sheet metal construction with rivets, such as rivets 56 and 58 to be used to join the sheets together. In this regard, elongated liquid collectors 38 through 48 are connected to vapor riser pairs 26A, 26B–36A, 36B through sheet metal tabs 53.

Turning back to distributor trough 50, preferably, bottom openings 52 should be sized larger than apertures 12 in order to allow the central redistribution of the liquid to a central part of tray 10. Preferably, the total open area of bottom openings 52 is 60% of the entire open area provided by apertures 12.

It is to be noted that chevron-like collectors could be employed so that all, instead of part, of the descending liquid were caught in the collectors. In such case, all of the liquid would be directed/channeled from the collectors to a central region of the liquid distributor tray. Furthermore, although the present invention is illustrated with riveted construction, the present invention contemplates welded construction with distributor trough 50 being connected to vapor risers such as vapor riser pairs 26A,26B through 36A,36B to support distributor trough 50 above tray 10.

Although the present invention has been described with reference to a preferred embodiment, as will occur to those skilled in the art, numerous changes, additions and omissions may be made without departing from the spirit and scope of the present invention.

We claim:

1. A liquid distributor tray for a distillation column for distributing a descending liquid phase to be contacted with an ascending vapor phase within said distillation column, said liquid distributor tray comprising:

a tray for collecting said descending liquid phase and having rows of apertures for downward passage of said descending liquid phase;

a plurality of rows of vapor risers located between said rows of apertures for passage of said ascending vapor phase, in an upward direction, through said tray;

a plurality of rows of elongated liquid collectors located above said rows of vapor risers and between said rows of apertures for collecting at least part of the descending liquid phase before said descending liquid phase reaches said tray;

said rows of elongated liquid collectors having central redistribution means for redistributing said at least part of said descending liquid phase over a central region of said tray; and a distributor trough located beneath said central redistribution means and over said central region of said tray for collecting said part of said descending liquid phase, said trough having rows of openings for introducing said at least part of said descending liquid onto said tray.

2. The liquid distributor tray of claim 1, wherein said distributor trough and said vapor risers are connected to one another.

3. The liquid distributor tray of claim 2, wherein:

each of said vapor risers has a rectangular, transverse cross-section oriented at right angles to said distributor trough;

said plurality of vapor risers comprise a plurality of pairs of vapor risers situated such that said distributor trough passes between said pairs of said vapor risers and is connected thereto;

said tray is disk shaped and has a diameter; and the rectangular, transverse cross-section of said vapor risers increasing in size as said vapor risers approach said diameter of said tray so that said vapor risers and said distributor trough form a structure that increases stiffness of said tray in orthogonal directions.

4. The liquid distributor tray of or claim 3, wherein an open area of said openings is about 60% of that of said apertures.

5. The liquid distributor tray of claim 3, wherein said tray, said vapor risers, and said distributor trough are of sheet-metal construction and are riveted to one another.

6. The liquid distributor tray of claim 5, wherein an open area of said rows of openings is about 60% of that of said rows of apertures.

7. The liquid distributor tray of claim 1 or claim 3 or claim 5, wherein said central redistribution means comprises a central row of overflow slots defined within sidewalls of said rows of elongated liquid collectors.

8. The liquid distributor tray of claim 7, wherein an open area of said rows of openings is about 60% of that of said rows of apertures.

9. A liquid distributor tray for a distillation column for distributing a descending liquid phase to be contacted with an ascending vapor phase within said distillation column, said liquid distributor tray comprising:

a tray for collecting said descending liquid phase and having rows of apertures for downward passage of said descending liquid phase;

a plurality of rows of vapor risers located between said rows of apertures for passage of said ascending vapor phase, in an upward direction, through said tray;

a plurality of rows of elongated liquid collectors located above said rows of vapor risers and between said rows of apertures for collecting at least part of the descending liquid phase before said descending liquid phase reaches said tray;

said rows of elongated liquid collectors having a central redistribution means comprising central row of overflow slots defined within sidewalls of said rows of elongated liquid collectors for redistributing said at least part of said descending liquid phase over a central region of said tray.

* * * * *